INVENTOR
GEORGE G. GORBATENKO
BY Richard H. Smith
ATTORNEY

March 17, 1970 G. G. GORBATENKO 3,501,625

ANALOG TO DIGITAL CONVERTER

Filed July 23, 1965 5 Sheets-Sheet 2

3,501,625
ANALOG TO DIGITAL CONVERTER

George G. Gorbatenko, Rochester, Minn., assignor to International Business Machines Corporation, Armonk, N.Y., a corporation of New York Filed July 23, 1965, Ser. No. 474,254
Int. Cl. G06f *5/00;* H03k *13/02*
U.S. Cl. 235—154 11 Claims

ABSTRACT OF THE DISCLOSURE

A converter is provided having a single comparator for producing an output signal in response to an analog signal which exceeds one or more predetermined thresholds. Each of a plurality of subtracting amplifiers has a first input connected to the output of its preceding amplifier and a second input connected to a digital to analog converter. Each amplifier has a constant gain equal to the radix of the number system employed. A control circuit sequentially connects the first input of each amplifier to the comparator and the second input of each amplifier to its corresponding digital-analog converter. A coding circuit is set by the comparator to provide a parallel digital output representative of the analog input.

The present invention relates to an analog to digital converter of the "digit-at-a-time" type and, more particularly, to an analog to digital converter having minimized hardware requirements.

An early teaching of a "digit-at-a-time" analog to digital converter (ADC) is found at pages 5–56 to 5–60 of the text Notes On Analog-Digital Conversion Techniques, MIT Technology Press-John Wylie and Sons, 1957, by A. K. Susskind. That disclosure shows (FIG. 5–37) the use of a plurality of cascaded digit generation stages each of which includes a binary (single level) comparison or discrimination circuit, a subtractor and a radix amplifier with a gain of two. In operation, an analog input is applied, in parallel, to the comparison and subtraction circuits of the most significant digit generation stage. The comparison circuit compares the signal with a predetermined reference voltage level and if the input exceeds the reference level, the circuit issues a digital "1" output signal and transmits a voltage signal having a magnitude equal to the reference level to the first stage subtraction circuit. There the level is subtracted from the original input signal and the difference is multiplied by two by the first stage radix amplifier. If the input does not exceed the reference level, a signal having a magnitude equivalent to zero is transmitted to the subcontractor and the amplifier output is twice the original analog input. The output from the radix amplifier is entered as an analog input into the next most significant digit generation stage, which is identical to the first stage, and the conversion proceeds in a similar fashion until analog input signals have been applied to all the digit stages and each comparison circuit has issued a digital output signal. It is known that this technique of analog to digital conversion is relatively high speed and produces results having an accuracy dependent on the accuracy of the comparison circuits.

Subsequent ADC circuits have utilized this principle of operation to perform digital conversions in other numerical systems, e.g., decimal. This has been done by increasing the number of reference levels in the comparison circuits. A decimal digit-at-a-time ADC requires nine comparison levels, a trinary three, an octal eight, etc. Also the radix amplifier in such an expanded circuit must have a gain equal to the radix of the system, e.g., ten for decimal. A primary drawback experienced in expanding this conversion technique to the higher radix number systems has been the complexity of the comparison circuits, compounded by the fact that an individual comparison circuit is required for each digit generation stage. Hardware requirements thus easily become prohibitive both from a size and cost standpoint.

Another ADC technique which utilizes the digit-at-a-time principle of operation but which minimizes hardware requirements is the so-called re-entrant technique. An example of such a scheme is found in U.S. Patent 3,072,332 to Margopoulos. The converter there shown employs only a single digit generator stage and recirculates the analog signal through it a number of times equal to the number of output digits required. While the hardware savings derived from using this circuit for high radix conversions are marked, the radix-factor variable gain amplifier employed therein is required to operate at undesirably high gains, i.e., in a decimal conversion it is required to operate at 100 during the third digit cycle, 1000 during the fourth, 10,000 during the fifth, etc. Operation at gains of this magnitude results in appreciable losses of both speed and accuracy. This is because as the gain of the amplifier is increased, the bandwidth of the amplifier is correspondingly reduced. This produces a non-linear increase in the amount of settling time required to reduce the amplifier output error to the same level after each digit generation cycle. Thus, a decimal conversion calling for only four or five digits of quantization calls for a sacrifice in conversion speed (assuming maintenance of a reasonable accuracy level) which is tolerable only in lower speed ADC applications. Further, as the amplifier is increased in gain, proportionately higher feedback resistances are required. Higher value resistors cannot be manufactured to the same accuracy tolerances as those of lower value and thus even further accuracy restrictions are placed on converter performance.

It is therefore an object of the present invention to provide an ADC of the digit-at-a-time type having the speed and accuracy of previous cascaded-stage circuits, but conserving hardware to an extent approaching that exhibited by re-entrant circuits.

A further object is to provide an improved digit-at-a-time ADC which does not employ a high gain amplifier.

Another object is to provide an improved digit-at-a-time ADC that does not require a separate comparison circuit for each digit generation stage.

Still another object is to provide an improved digit-at-a-time ADC that generates a binary-coded-octal output.

In accordance with the present invention, an ADC circuit is provided having an individual radix amplifier for each digit generation stage and only a single comparison circuit which is time-shared among the several digit stages. The maximum gain required of any individual amplifier is equal to the radix of the number system employed. Further, speed is maximized by arranging the circuit components that require "settling time" in such a fashion that they settle out simultaneously rather than serially.

The foregoing and other objects, features and advantages of the invention will be apparent from the following more particular description of a preferred embodiment of the invention, as illustrated in the accompanying drawings.

OVERALL CIRCUIT

Figure 1:
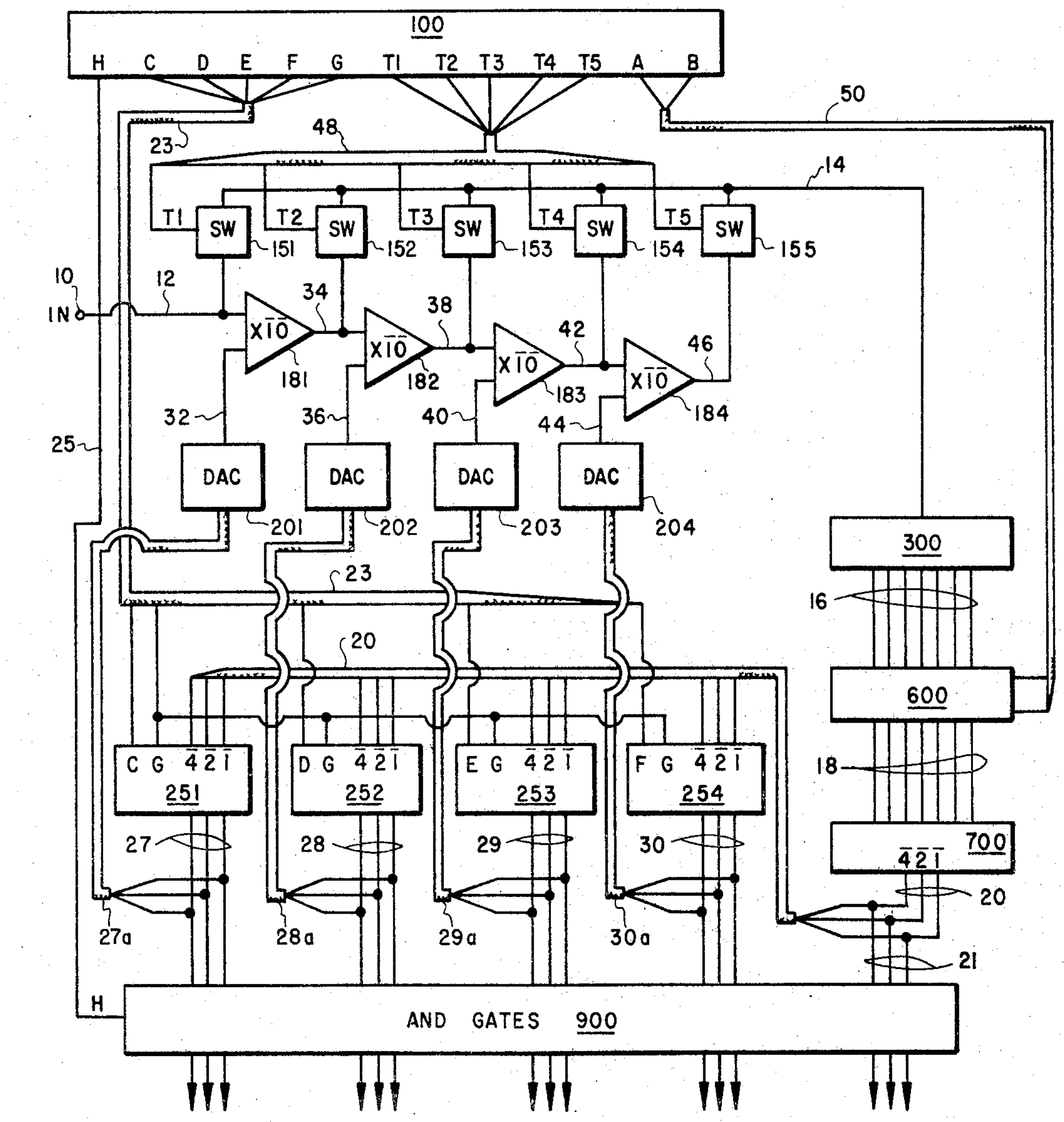
FIG. 1 is a schematic diagram showing the overall ADC circuit of the invention.

With reference to FIG. 1, the overall circuit of the invention is hereinafter described. As has been mentioned, the converter of the invention performs digital conversions in the octal system. The octal system employs the eight digits $\overline{0}$, $\overline{1}$, $\overline{2}$, $\overline{3}$, $\overline{4}$, $\overline{5}$, $\overline{6}$ and $\overline{7}$ (the horizontal bars are used to avoid confusion with the similar digit symbols used in decimal notation) and has a radix of $\overline{10}$ (decimal eight). For the sake of consistency and to avoid the cumbersome process of transforming values from octal to decimal and vice versa, all numerical quantities are hereinafter expressed in octal notation. It is believed to be fully within the capabilities of one skilled in the analog conversion art to employ the principles hereinafter taught in performing conversions in the decimal or any other number system.

Analog input terminal 10 is connected to an analog voltage source such as, for example, a sample and hold amplifier which is fed by a time-varying voltage signal to be digitized. A steady-state input voltage is transmitted to the first digit generation stage of the ADC circuit via input line 12. This voltage is applied in parallel to the input terminal of a first analog switch 151 and to a first input port of a non-inverting, subtracting amplifier 181 having a gain of $\overline{10}$. The output line 34 of amplifier 181 is connected to the first input port of a second stage subtracting amplifier 182, also having a gain of $\overline{10}$. Likewise, the output line 38 from amplifier 182 is connected to the first input port of third stage times $\overline{10}$ subtracting amplifier 183 and the output line 42 of amplifier 183 is connected to the first input port of fourth stage times $\overline{10}$ subtracting amplifier 184 having an output line 46. Second, third, fourth, and fifth digit stage analog switches 152, 153, 154 and 155, respectively, have their input terminals connected to amplifier output lines 34, 38, 42 and 46, respectively. The output terminals of the five analog switches are connected to a common signal line 14 which is the input for a bank of comparator circuits 300. The switches are controlled by timing pulses issuing on bus 48 from a timing circuit 100.

The comparator circuit 300 comprises seven threshold circuits (differential amplifiers) each having a different voltage reference level. For simplicity of description, it is herein assumed that the input range of the ADC circuit is $\overline{10}$ volts, i.e., the analog input signal at terminal 10 never falls below zero volts and never exceeds $\overline{7.7777}$+ volts. The seven threshold circuits in comparator bank 300 are thus referenced to the respective voltage levels of $\overline{1}$ v., $\overline{2}$ v., $\overline{3}$ v., $\overline{4}$ v., $\overline{5}$ v., $\overline{6}$ v. and $\overline{7}$ v. It is, of course, understood that any voltage range and corresponding threshold levels may in actuality be employed. As will be hereinafter explained in detail, all threshold circuits of comparator bank 300 which are referenced to a voltage level substantially equal to or below the level of the signal on input line 14 produce a positive level output signal. Those threshold circuits referenced to a voltage level higher than that on input line 14 produce no output signal.

Threshold circuit output signals issuing from comparator bank 300 in response to an analog signal on line 14 are fed via output lines 16 to a comparator register 600 where they are temporarily stored. The digital signals so stored appear on the seven output lines 18 of the register 600 as "one" or "zero" voltage levels and are applied to an encoding circuit 700. Circuit 700 converts the signal pattern appearing on the lines 18 to a single binary-coded-octal (BCO) digit representing the magnitude of the voltage reference level to which the actuated threshold circuit having the highest reference level is tied. This is done, as hereinafter described in detail, through standard AND-OR-inverter logic. The output from encode circuit 700 is a three-bit BCO output signal appearing on the three output lines 20. The numerical significance attached to the binary signals on the three lines 20 is $\overline{4}$, $\overline{2}$ and $\overline{1}$ in accordance with binary convention.

The three-bit signal on the lines 20 is transmitted in parallel to four DAC storage registers 251, 252, 253 and 254. Each of these storage registers includes a three-position binary storage circuit. Also included in each register are means for selectively gating the digital output signals on lines 20 into selected ones of the registers in response to timing signals supplied by circuit 100 via bus 23. BCO information stored in the registers 251, 252, 253 and 254 is transmitted via the register output lines 27, 28, 29 and 30 both to a set of output AND gates 900 and to a plurality of digital to analog conversion (DAC) circuits 201, 202, 203 and 204, respectively.

The DAC circuits cooperate with their associated subtracting amplifiers in a manner hereinafter described to produce a signal at the amplifier output which is $\overline{10}$ times the difference between the magnitude of the signal fed to the amplifier from the preceding stage and the magnitude of the voltage level represented by the digit stored in the DAC register associated with the particular amplifier.

At the end of a conversion the BCO signals stored in the DAC registers 251, 252, 253 and 254 and the comparator register 600 are gated to desired utilization circuits through the output AND gates 900 by a pulse issuing on line 25 from circuit 100.

OVERALL CIRCUIT OPERATION

Figure 3:
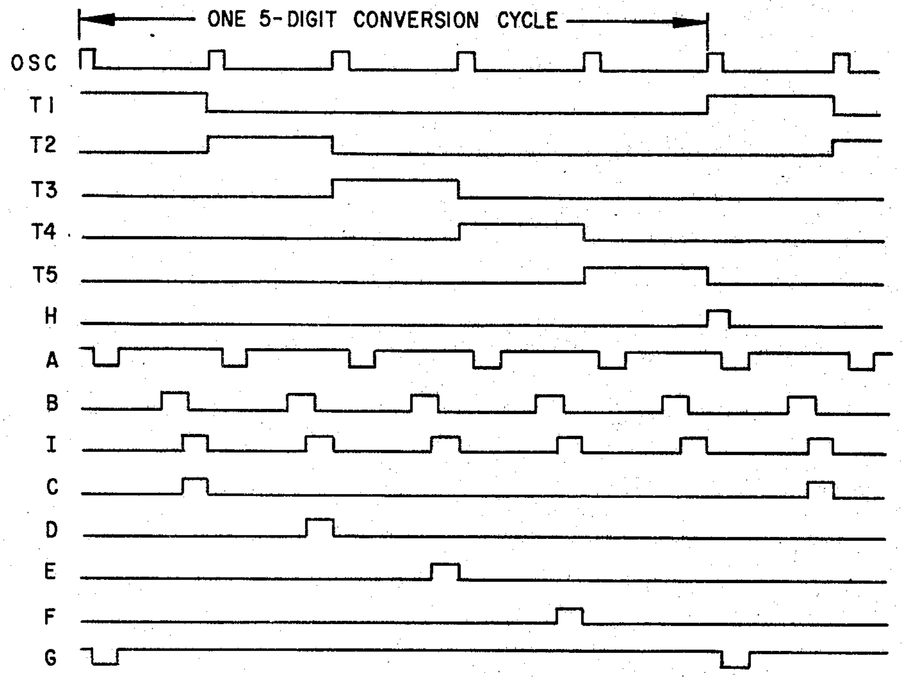
FIG. 3 is a timing diagram illustrating the time relationship between the various output pulses produced by the timing circuit of FIG. 2.

With reference now to FIGS. 1 and 3, a description is hereinafter given of the operation of the circuit of FIG. 1 in performing a five digit conversion of an analog input signal having a magnitude equal to $\overline{5.7246}$ volts.

At the beginning of the cycle, timing circuit 100 supplies a pulse T1 over multi-wire bus 48 to close the switch 151, transferring the analog input signal on line 12 to comparator input line 14. The analog signal thus presented to comparator bank 300 actuates five of the seven threshold circuits therein and output signals are thus generated on five of the lines 16. Immediately after switch 151 closes and during the time that its output is settling to a reasonably steady state, negative-going pulses A and G are issued from timing circuit 100 over multi-wire buses 50 and 23, respectively, to reset the comparator register and the DAC registers. Next, a positive-going pulse B is issued over bus 50 to gate the signals on output lines 16 from comparator circuit 300 into the comparator register 600. It is to be noted that the gating pulse B does not appear until near the end of the interval of pulse T1. This allows a maximum amount of time for the transient effects generated on line 14 due to the closing of switch 151 to settle out. As soon as the comparator register has been loaded in response to pulse B and the output signals on the lines 16, encode circuit 700 generates a digital output signal on the lines 20 consisting of a signal on the "$\overline{4}$" line and a signal on the "$\overline{1}$" line, representing the digit $\overline{5}$. This BCO signal on the lines 20 is presented to the inputs of DAC register 251 and a gating pulse C issues over bus 23 to enter it into the register. The number thus stored in register 251 represents the most significant digit of the output and its presence in the register signifies the completion of the first digit generation period.

As soon as digit signals are available on output lines 27 from the register 251, they are presented to the inputs of DAC circuit 201 via the bus **27*a*. These digital inputs into the circuit 201 precisely alter the offsetting or bucking voltage presented to the amplifier such that by superposition an output is produced from the amplifier having a magnitude which is $\overline{10}$ times the difference between the magnitude of the signal on line 12 ($\overline{5.7246}$ volts) and the magnitude of the voltage level represented by the BCO digit stored in DAC register 251 ($\overline{5}$ volts). The magnitude of the signal on line 34** is therefore $\overline{7.246}$ volts.

At substantially the same time the output signals became available on lines 27 from DAC register 251, timing pulse T1 terminated and pulse T2 was initiated to begin the second digit generation period. Signal transients caused by the activation of the switches and resistors in DAC circuit 201, by the change in inputs to amplifier 181, by the opening of switch 151 and the closing of switch 152 are thus all substantially simultaneously initiated and allowed to settle during substantially the same time period. This conserves circuit time and avoids the situation in which subsequent circuit elements cannot be activated with accuracy until prior elements have settled out.

The new signal on comparator input line 14 ($\overline{7.246}$ volts) actuates all seven threshold circuits in comparator 300, producing output signals on all of the lines 16. During the time in which this new signal on line 14 was stabilizing, a second A pulse issued on timing bus 50 to reset comparator register 600. A second B pulse then issues on timing bus 50 to load the stabilized signals on output lines 16 into the comparator register. The ensuing presence of all "one" signals on output lines 18 from the register 600 causes encode circuit 700 to issue signals on all three of its output lines 20 to signify the digit $\overline{7}$. This BCO signal, representing the second most significant output digit, is transmitted via the lines 20 to the inputs of DAC register 252 whereupon it is caused to be stored therein by the gating pulse D issuing on bus 23. The presence of this output digit on the output lines 28 of register 252 signifies completion of the second digit generation period and activates the inputs, via lines 28*a*, of DAC circuit 202. At this time pulse T2 terminates and pulse T3 is initiated to begin the third digit generation period.

As the transients due to activation of the circuits 202, 182, 152 and 153 are settling and the input line 14 of comparator bank 300 is approaching its new voltage level of $\overline{2.46}$ volts, a third A pulse issues on timing bus 50 to reset comparator register 600. Thereafter a third B pulse gates the new pattern of threshold output signals on the lines 16 into the register 600, setting up output signals on two of the lines 18. Encode circuit 700 responds with a single output signal on its "$\overline{2}$" output line representative of the magnitude ($\overline{2}$) of the third most significant output digit. This signal is gated into DAC register 253 by timing pulse E and the timing pulses T3 and T4 terminate and initiate, respectively, to begin the fourth digit generation period.

Thereafter, comparator register 600 is reset by a fourth A pulse and comparator input line 14 receives, after transients due to the activation of the circuits 203, 183, 153 and 154 have settled, a new voltage level equal to $\overline{4.6}$ volts. This causes four of the lines 16 to transmit output signals to the register 600 and, after a fourth B pulse has gated these signals into the register 600, causes encode circuit 700 to issue a signal on its output lines 20 representative of the digit $\overline{4}$ which is the fourth most significant output digit. This digit is gated into DAC register 254 by gating pulse F transmitted from timing circuit 100 via bus 23.

Thereafter, pulse T4 terminates and T5 is initiated to begin the fifth and final digit generation period. After a fifth A pulse has reset comparator register 600 and the transients due to the activation of the circuits 204, 184, 154 and 155 have settled, a new voltage level equal to $\overline{6.0}$ volts appears on line 14. A fifth B pulse then gates the new signal pattern appearing on lines 16 into the register 600, causing six of the lines 18 to produce output signals. Encode circuit 700 thereafter responds with signals on its "$\overline{4}$" and "$\overline{2}$" output lines 20 representing the final digit $\overline{6}$, which signals are transmitted by lines 21 to the output AND gates 900. Just prior to the occurrence of the initial A and G reset pulses of the ensuing digit conversion period, a pulse H issues from circuit 100 on line 25 to activate all the AND gates 900, thereby transferring the digital outputs appearing on the lines 27, 28, 29, 30 and 21 to any desired external utilization circuits (not shown). Thereafter, a new analog input voltage is presented on input terminal 10 and another five-digit conversion is performed in the manner just described.

DETAILED CIRCUIT DESCRIPTION

Timing circuit 100

Figure 2:
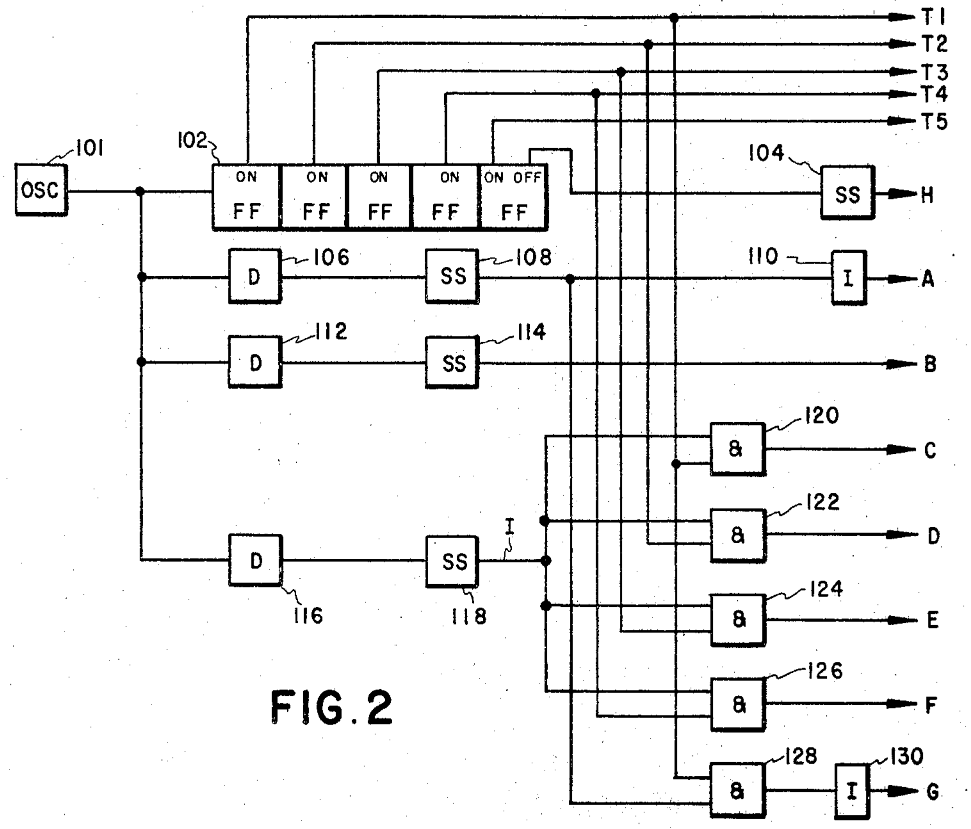
FIG. 2 is a schematic diagram of the timing circuit 100.

FIG. 2 shows, in schematic form, one embodiment of a circuit which may be employed for the timing circuit 100 of FIG. 1 to produce the various waveforms shown in FIG. 3. An oscillator circuit 101 produces, in a continuous sequence, the output pulses shown at the top of the waveform diagram of FIG. 3. These pulses are fed to the inputs of a ring circuit 102 and of delay circuits 106, 112 and 116. The ring circuit 102 comprises a plurality of bistable flip-flops interconnected in a well-known fashion so that only one of the flip-flops can be on at a given time and such that each pulse applied at the input to the ring turns off the flip-flop then on and turns on the next succeeding flip-flop in the ring. The timing pulses T1 through T5 are taken from each of the respective "on" outputs of the different flip-flops in the ring.

The "off" output of the final flip-flop in the ring is connected to a singleshot multivibrator 104, the output from which is employed as the waveform H used to gate the digital output from AND gates 900 at the end of each conversion cycle. Singleshot 104 is triggered only by positive-going transitions, thus produces the pulse H only once per conversion cycle, i.e., when the end flip-flop of ring 102 is turned off at the termination of timing pulse T5.

Delay circuit 106 has its output connected to the input of a singleshot multivibrator 108 which in turn is connected to an inverter 110. The output of the latter circuit yields the negative-going A pulses which are used to reset the comparator register 600 immediately following initiation of each of the timing pulses T1–T5. Delay circuit 106 may be any of the various well-known types of delay circuits and provides an amount of delay as indicated in FIG. 3 by the time differential between the leading edge of the oscillator output pulse and the leading edge of each succeeding A pulse.

Delay circuit 112 feeds the input of a singleshot multivibrator 114, the output of which supplies the B pulses which are used to load comparator register 600 during the latter portion of each of the timing intervals T1–T5. The amount of delay provided by the circuit 112 is illustrated in FIG. 3 by the time differential between the leading edge of each oscillator pulse and the leading edge of each succeeding B pulse.

Delay circuit 116 has its output connected to the input of a singleshot multivibrator 118 which produces the waveform I which is transmitted to a first input of each of a plurality of AND circuits 120, 122, 124 and 126. The second input to each of these AND circuits is supplied from the "on" output of each of the first four flip-flops of the ring circuit 102. The output signals generated by AND circuits 120, 122, 124 and 126 are the waveforms C, D, E and F, respectively, which are used to load the output from encoding circuit 700 into the DAC registers 251, 252, 253 and 254. As can be determined from FIG. 3, the amount of delay required in circuit 116 is proportional to the distance from the leading edge of an oscillator pulse to the leading edge of the succeeding I pulse.

AND circuit 128 produces an output pulse coinciding with the first A pulse of each digit conversion cycle. This pulse is fed to an inverter 130, the output from which is the negative-going pulse G used to reset all of the DAC registers at the beginning of a digit conversion cycle.

Input switches, radix amplifiers and DAC circuits

Figure 4:
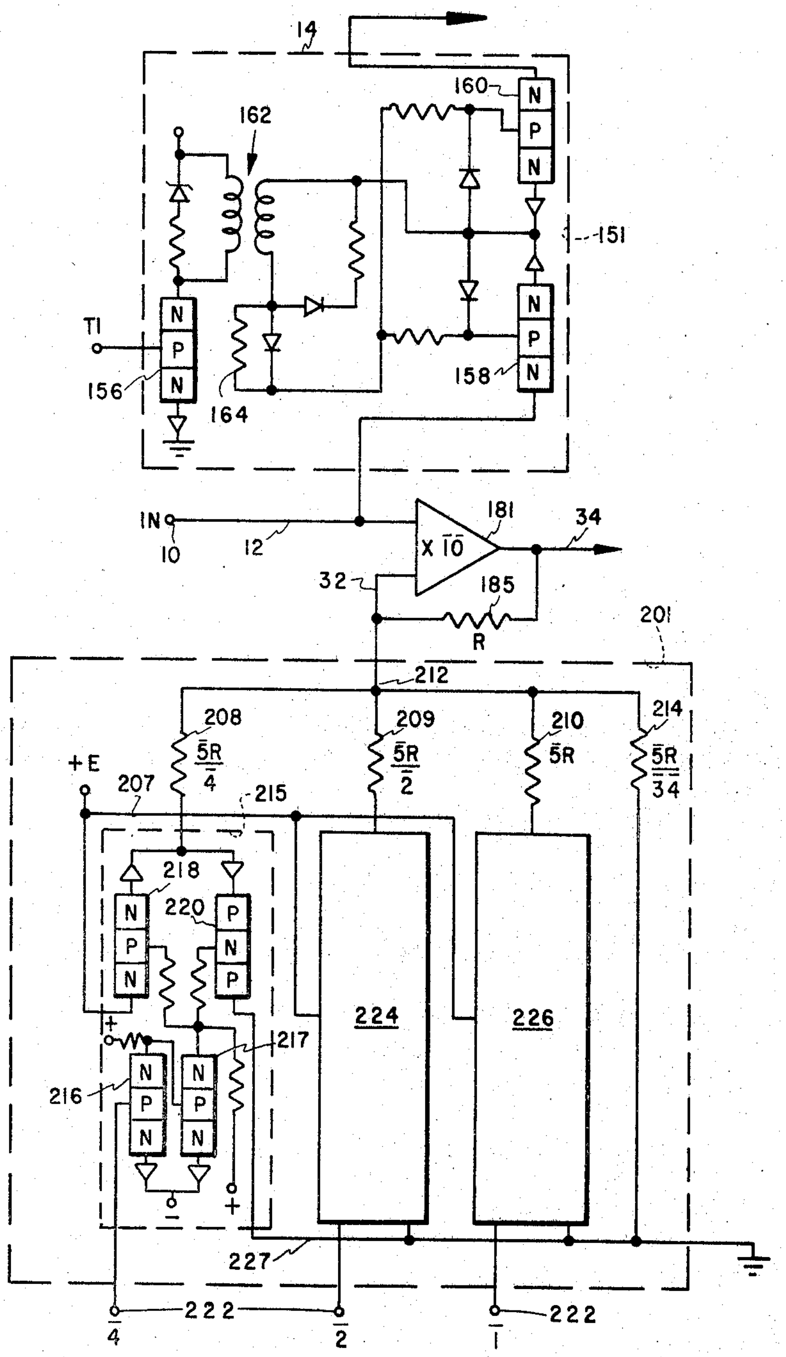
FIG. 4 is a circuit diagram showing the circuit details of the first digit generation stage input switch 151 and digital to analog converter 201.
Figure 5:
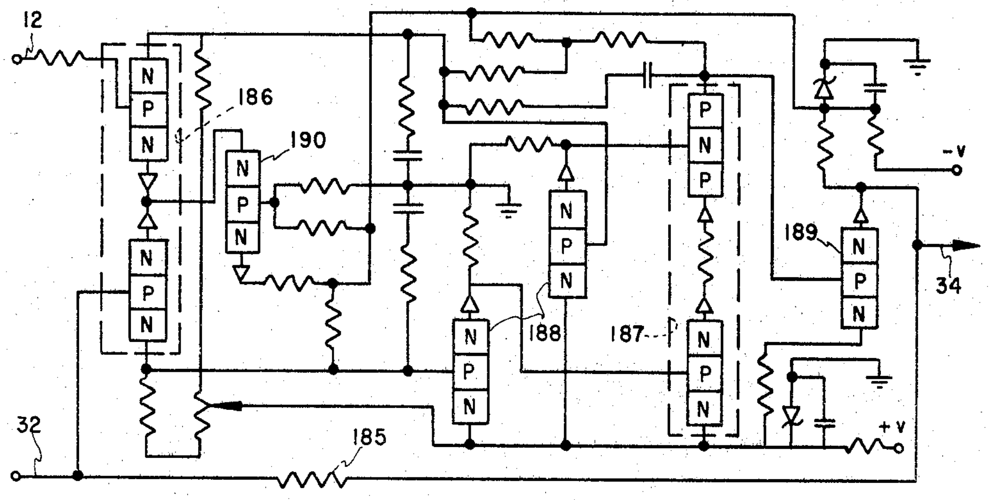
FIG. 5 is a circuit diagram of radix amplifier 181.

With reference to FIGS. 4 and 5, a detailed description of input switch 151, radix amplifier 181 and digital to analog converter circuit 201 of the first digit generation stage is hereinafter given. It is to be understood that the corresponding circuits of each of the succeeding digit generation stages are identical to those of the first stage and that detailed description of them is unnecessary. Input switch 151 (FIG. 4) includes control transistor 156, input transformer 162 and a pair of signal path transistors 158 and 160. Timing pulse T1 is supplied over bus 48 from the timing circuit 100 to the base of transistor 156. The leading, positive-going edge of T1 saturates transistor 156 and causes a current pulse to be drawn through the primary winding of transformer 162. This pulse begins driving the transformer towards its saturation point producing an output voltage across the secondary, which voltage is applied across the base to emitter junctions of both signal path transistors 158 and 160, driving them into saturation. This opens a low impedance analog signal path to transfer the analog input signal on input line 12 to comparator input line 14 through the collector to emitter conduction paths of the transistors 158 and 160.

The bandwidth and duty cycle characteristics of transformer 162 are chosen so that the voltage pulse induced across the secondary is a relatively good reproduction of the input pulse T1. When T1 terminates, transistors 158 and 160 are rapidly driven out of saturation by means of a sharply dropping pulse produced through the conduction path provided by resistor 164. This re-opens the switch 151 to cut off the connection between input line 12 and comparator input line 14.

The radix amplifier 181, shown schematically in FIG. 4 and in detail in FIG. 5, is a DC, non-inverting, subtracting amplifier having a gain of $\overline{10}$ from its input port 12 to its output 34. Two conventional gain stages 186 and 187 are interconnected by a double emitter follower 188. An emitter follower 189 transmits the output from the second gain stage 187 to output line 34. A constant current source 190 is used to increase the common mode rejection ratio of the first gain stage 186. A feedback resistor 185 is connected from output line 34 to the second input port 32. The DAC circuit 201, shown in detail in FIG. 4, is also a part of the amplifier feedback circuit and acts in accordance with digital inputs received at its input terminals 222 from the DAC register 251 to reduce the signal on line 34 so that it is $\overline{10}$ times the difference between the magnitude of the signal on line 12 and the magnitude of the voltage level represented by the digital signals applied to terminals 222.

DAC circuit 201 includes three resistors 208, 209 and 210 having the respective resistance values of $\overline{5}R/\overline{4}$, $\overline{5}R/\overline{2}$ and $\overline{5}R$ in the binary ratio of $\overline{1}:\overline{2}:\overline{4}$. One end of each of these resistors is connected to common junction point 212. The other ends of the resistors 208, 209 and 210 are connected to the output terminals of the single pole, double throw (SPDT) switches 215, 224 and 226, respectively. Reference potentials of +E and $\overline{0}$ volts are supplied to the switches via the lines 207 and 227, respectively. Control inputs are supplied to the switches from DAC input terminals 222 which, as previously mentioned, receive control signals via signal bus 27a from the output lines 27 of DAC register 251.

The SPDT switches 215, 224 and 226 are identically constructed and only the circuit for switch 215 is shown in detail. The switch includes a pair of control transistors 216 and 217 and a pair of switch transistors 218 and 220. The DAC input signal received on the "$\overline{4}$" terminal 222 is transmitted to the base of transistor 216. When a positive-going signal signifying a "one" bit appears on the line, transistor 216, which is of the NPN type, becomes conducting, causing a negative-going signal transition to occur at the base of transistor 217 which turns that transistor off. This causes positive-going transitions to be presented to the bases of transistors 218 and 220. Since the latter transistors are of the NPN and PNP types, respectively, transistor 218 is rendered conductive and 220 nonconductive. This connects resistor 208 through a low impedance path to the voltage line 207, connecting the voltage +E into the feedback path of amplifier 181 through the resistor 208. When no digit signal is received at terminal 222, transistor 216 remains nonconductive and the voltage levels at the bases of transistors 218 and 220 stay down, sustaining the former in a nonconducting state and the latter in a conducting state. This connects the $\overline{0}$ volts (ground) of line 227 into the feedback path of amplifier 181 through the resistor 208.

A shunt resistor 214 having a resistance value of $\overline{5}R/\overline{34}$ is connected from junction point 212 to ground line 227 in order to render the value of the equivalent resistance of the network including $R_{208}$, $R_{209}$, $R_{210}$ and $R_{214}$ proper for operation in accord with the principles set forth below.

The gain of amplifier 181 from input port 12 to output line 34 is calculated as follows:

$$G=\frac{R_{185}+R_e}{R_e}$$

where $R_e$ equals the equivalent resistance of $R_{208}$, $R_{209}$, $R_{210}$ and $R_{214}$. Since $$\frac{\overline{1}}{R_e}=\frac{\overline{4}}{\overline{5}R}+\frac{\overline{2}}{\overline{5}R}+\frac{\overline{1}}{\overline{5}R}+\frac{\overline{34}}{\overline{5}R}$$

$R_e$ equals $R/\overline{7}$. Since the value of resistor 185 is equal to R, $$G=\frac{R+\frac{R}{\overline{7}}}{\frac{R}{\overline{7}}}=\overline{10}$$

The output voltage $V_o$ on line 34 under any given set of input conditions may thus be represented as follows:

$$V_o=\overline{10}V_{in}-R_{185}\left[\frac{X_{215}E}{R_{208}}+\frac{X_{224}E}{R_{209}}+\frac{X_{226}E}{R_{210}}\right] \quad (1)$$

where the values of $X_{215}$, $X_{224}$ and $X_{226}$ are $\overline{1}$ if the control inputs to the respective switches 215, 224 and 226 are "one" and are $\overline{0}$ if the input signals to the respective switches are "zero."

Thus, for example, if the input voltage on line 12 is equal to $\overline{5}.\overline{5}$ volts, the digital feedback signals to the input termnials 222 of DAC circuit 201 from the encoding circuit 700 represent the BCO digit $\overline{5}$ and appear as "one" input signals to the switches 215 and 226. The signal on output line 34 from the amplifier 181 in accordance with Equation 1 is thus:

$$V_o=\overline{10}\times\overline{5}.\overline{5}-R\left(\frac{E}{\frac{\overline{5}R}{\overline{4}}}+\frac{E}{\overline{5}R}\right)=\overline{55}-E$$

With the reference voltage E set at a constant $\overline{50}$ volts, the output on line 34 is equal to the required $\overline{5}.\overline{0}$ volts. If the input on line 12 is $\overline{3}.\overline{5}$ volts, the output is $$V_o=\overline{10}\times\overline{3}.\overline{5}-R\left(\frac{\overline{50}}{\frac{\overline{5}R}{\overline{2}}}+\frac{\overline{50}}{\overline{5}R}\right)$$

$$=\overline{35}-R\left(\frac{\overline{170}}{\overline{5}R}\right)=\overline{5}.\overline{0}\text{ volts}$$

Comparator 300 and comparator register 600

Figure 6:
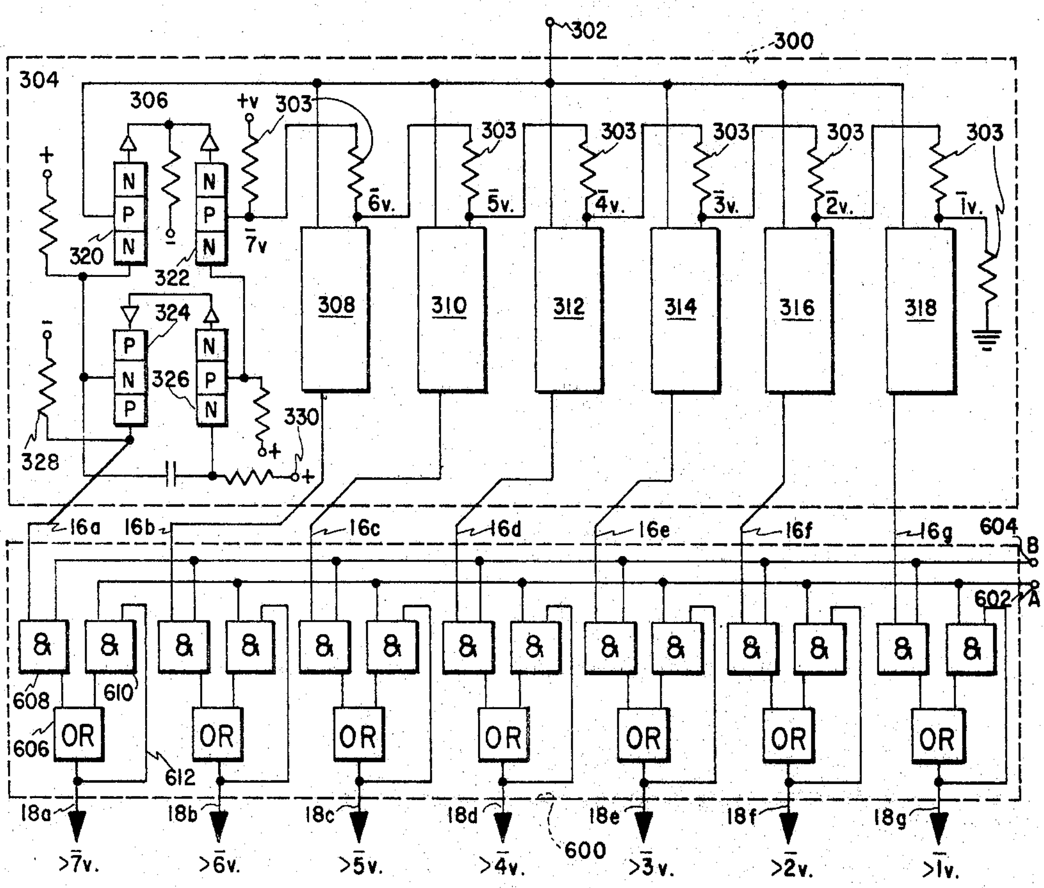
FIG. 6 is a schematic diagram of the comparator circuit 300 and comparator register 600.

The comparator circuit 300 and comparator register 600 are shown in detail in FIG. 6. Comparator 300 comprises a bank of seven threshold circuits (differential amplifiers) 306, 308, 310, 312, 314, 316 and 318. Comparator input terminal 302 is connected to the line 14 and supplies each threshold circuit via a line 304 with the analog input signal transmitted on line 14 from the input switches 151, 152, 153, 154 and 155. Each threshold circuit is connected to a different voltage reference level established by the voltage divider including the resistors 303 which are connected between a source of reference potential +V and ground. As shown, the threshold circuits 306, 308, 310, 312, 314, 316 and 318 receive reference voltage levels of $\bar{7}$ volts, $\bar{6}$ volts, $\bar{5}$ volts, $\bar{4}$ volts, $\bar{3}$ volts, $\bar{2}$ volts and $\bar{1}$ volt, respectively. Any signal at input terminal 302 having a magnitude substantially equal to or in excess of the respective voltage reference level of a given threshold circuit causes that circuit to produce a positive output signal on its output line 16.

All threshold circuits are identically constructed and only the details of circuit 306 are shown. The circuit arrangement is that of a simple differential amplifier having input transistors 320 and 322, a control transistor 326 and an output transistor 324. When the signal on line 304 has a magnetic below $\bar{7}$ volts, transistors 320 and 322 are biased into non-conducting and conducting states, respectively. This sustains both the transistors 324 and 326 in non-conduction and output line **16*a* is maintained at a minus level established by the bias potential applied at terminal 328. When the signal on line 304 is raised above $\bar{7}$ volts, the states of the transistor 320, 322, 324 and 326 are reversed and a positive-going output "one" signal is produced on the output line 16*a*. The threshold circuits 308, 310, 312, 314, 316 and 318 operate in an identical fashion except that they are actuated to produce output signals on their output lines 16*b*–16*g*** in accord with their respective different threshold levels.

Comparator register 600, also shown in FIG. 6, comprises seven bistable logic circuits, each consisting of a pair of AND circuits 608 and 610 and an OR circuit 606. As shown in the waveform diagram of FIG. 3, the waveform A, which is applied to terminal 602, is normally held at a positive level and is pulsed negatively to reset the register positions. In the reset condition, the outputs of both AND circuits 608 and 610 and the OR circuit 606 of each register are in the down or "zero" condition. When a positive B pulse is applied to terminal 604, all the left-hand AND circuits 608, each of which is also connected to an output line from one of the comparator threshold circuits, are partially enabled. Each AND 608 circuit also receiving a "one" level signal from its comparator line passes an output signal through its OR circuit 606. This signal is fed back to the input of AND 610 via line 612 and "latches" the output of AND 610 up due to the presence of the normally positive level applied at terminal 602. This output signal remains until a negative-going A reset pulse is applied at terminal 602. The output signals thus appearing on output lines **18*a*–18*g* from the register 600 are a stored representation of the last occurring firing pattern generated on comparator output lines 16*a*–16*g***.

Encode circuit 700

Figure 7:
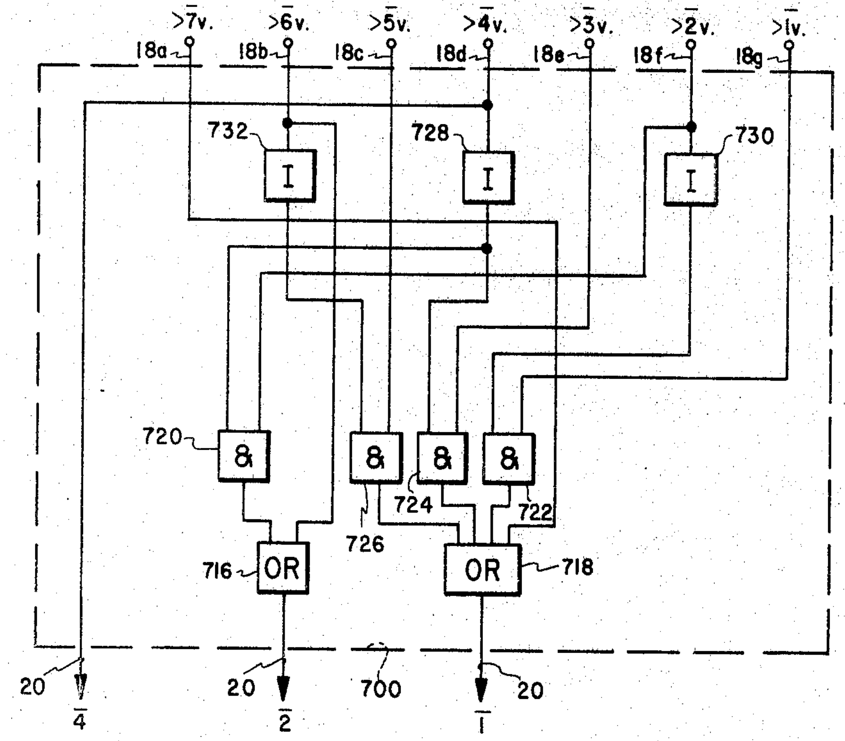
FIG. 7 is a schematic diagram of the encoding circuit 700.

The circuit details of encode circuit 700 are shown in FIG. 7. The circuit 700 receives as its inputs the signals from output lines **18*a* through 18*g* from comparator register 600. The pattern of signals present on these lines is converted by the circuit 700 to a BCO representation of the voltage reference level of the actuated threshold circuit in comparator bank 300 having the highest reference level. Thus, if no threshold circuits are actuated, no output pulses are present on the lines 18*a*–18*g* and none of the output lines 20 from the circuit 700 are activated. If only the lowest threshold circuit 318 is actuated, a "one" signal appears on line 18*g*. AND circuit 722, which is receiving a first "one" level input from inverter 730 connected to input line 18*f*, responds by producing a positive signal on "$\bar{1}$" output line 20 through the OR circuit 718. The output signals thus present on the lines 20 are a BCO representation of the voltage reference level ($\bar{1}$ volt) of the single actuated threshold circuit 318**.

If two threshold circuits are actuated, positive signals appear on both of the lines **18*g* and 18*f*. AND circuit 720 thus has both of its inputs activated and produces an output signal on the "$\bar{2}$" output line 20 through OR circuit 716. Even though there is a signal present on line 18*g*, AND circuit 722 is prevented from operating by the signal on line 18*f* acting through inverter 730. The output signals thus present on the lines 20** are a BCO representation of the voltage reference level ($\bar{2}$ volts) of the actuated threshold circuit having the highest reference level.

If three threshold circuits are actuated, signals appear on lines **18*e*, 18*f* and 18*g*. These signals enable both of the AND circuits 720 and 724, producing output signals on both the "$\bar{2}$" and "$\bar{1}$" output lines 20**. These signals, as before, are a BCO representation of the voltage reference level ($\bar{3}$ volts) of the actuated threshold circuit having the highest reference level.

If four threshold circuits are actuated, signals appear on lines **18*d*, 18*e*, 18*f* and 18*g* and only the "$\bar{4}$" output line 20 is activated. When five threshold circuits are actuated, signals appear on the five lines 18*c* through 18*g*. This input pattern activates the "$\bar{4}$" and "$\bar{1}$" output lines 20. When six threshold circuits are actuated, lines 18*b* through 18*g* produce output signals and the "$\bar{4}$" and "$\bar{2}$" lines 20 are activated. Finally, when all seven threshold circuits are actuated, all of the input lines 18 transmit signals to the circuit 700 and all three of the output lines 20 are energized. In each of these cases, the signals on the lines 20** are a BCO representation of the voltage reference level of the actuated threshold circuit having the highest level.

DAC register 251

Figure 8:
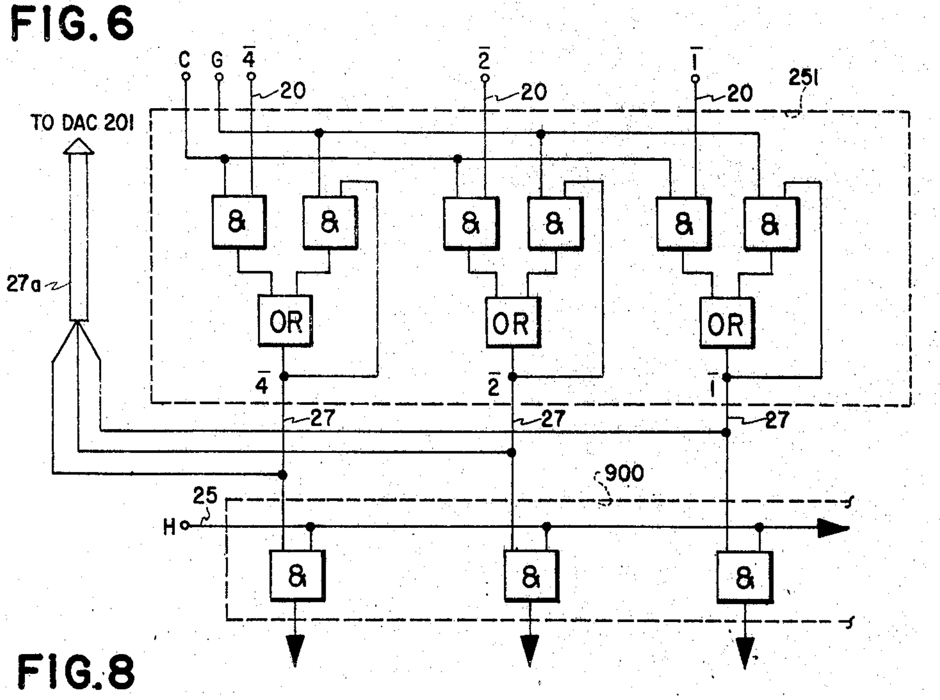
FIG. 8 is a schematic diagram of the first stage DAC register 251 and the output AND gates 900 associated therewith.

The circuit details of DAC register 251 are shown in FIG. 8. The DAC registers 252, 253 and 254 are constructed identically to the circuit 251, except that they respond to different timing pulses, and their detailed descriptions are therefore unnecessary. The register 251 comprises three AND-OR latch circuits identical to those employed in the comparator register 600, previously described. The negative-going pulse G applied to the right-hand AND circuit of each register position resets the register just as the reset pulse A resets the comparator register 600. The BCO signals presented by encode circuit 700 via the lines 20 are gated through the left-hand AND circuits of each of the three latches of the register 251 by the timing pulse C and are stored in the latches in a manner previously described with regard to the comparator register 600. BCO digit signals stored in the register 251 appear on the "$\bar{4}$," "$\bar{2}$" and "$\bar{1}$" output lines 27 thereof. These signals are transmitted directly to the inputs of the output AND gates 900 and are transmitted via lines **27*a* to the inputs of the DAC circuit 201**, previously described.

As previously described, a gating pulse H occurs at the end of each digit conversion cycle to enable the AND gates 900 to transfer the BCO output signals present on the output lines 27, 28, 29 and 30 of registers 251, 252, 253 and 254 and the output lines 21 from encode circuit 700 to an external utilization device. Each of these five BCO output digits represents a digit of the ADC output, the most significant digit being on the left.

While the embodiment of the invention herein described performs a conversion in the octal number system, it is to be understood that the circuit could, by slight modification, be made to operate in any number system. For example, to perform a decimal conversion, two more threshold circuits would have to be added to the comparator bank 300 and a like number of storage positions added to the register 600. Encode circuit 700 would require minor modifications to convert the firing pattern on the nine output lines of the register 600 to binary-coded-decimal. One additional output line 20 would be needed to represent the "8" digit position. Further, an extra storage position would have to be added to each of the registers 251, 252, 253 and 254 and an extra input switch and resistor would be required in each of the DAC circuits 201, 202, 203 and 204. Finally, the radix amplifiers 181, 182, 183 and 184 would have to be modified to provide a gain of ten.

Further, although the extent of quantization provided by the embodiment of the invention herein described is five digits, this is in no way intended to serve as a limitation since any number of digit stages, within reasonable limits allowing for circuit practicalities, may be utilized.

While the invention has been particularly shown and described with reference to a preferred embodiment thereof, it will be understood by those skilled in the art that the foregoing and other changes in form and details may be made therein without departing from the spirit and scope of the invention.

I claim:

1. An analog to digital converter, comprising:

signal-comparison means including an input circuit, said comparison means being actuatable to produce an output signal in response to a signal at said input circuit having a magnitude exceeding a predetermined level, said signal-comparison means further including an output circuit settable in response to said output signal to a condition representative of the magnitude of said predetermined level;

a plurality of amplifying means, each said means having a first and a second input and an output and having a gain not substantially exceeding the radix of the number system employed, said means being serially interconnected with the output of each connected to the first input of the next, each said amplifying means being connectable to said output circuit of said signal-comparison means to amplify by said radix the difference between a signal applied to said first input of said amplifying means and the level represented by the condition of said output circuit;

an analog input signal terminal connected to the first input of the first amplifying means in said series; and means for sequentially connecting the first inputs of said plurality of amplifying means to a common line adapted to carry variable analog difference signals from said amplifying means to the input circuit of said signal-comparison means, and for connecting the second inputs of said plurality of amplifying means to the output circuit of said signal-comparison means.

2. An analog to digital converter, comprising:

signal-comparison means including an input circuit and a plurality of threshold circuits connected to said input circuit, each said threshold circuit having a different threshold level and being actuable to produce an output signal in response to a signal at said input circuit having a magnitude exceeding the threshold level of said threshold circuit, said signal-comparison means further including an output circuit settable in response to said output signals to a condition representative of the magnitude of the threshold level of the actuated threshold circuit having the highest level;

a plurality of amplifying means, each said means having a first and a second input and an output and having a gain not substantially exceeding the radix of the number system employed, said means being serially interconnected with the output of each connected to the first input of the next, each said amplifying means being connectable to said output circuit of said signal-comparison means to amplify by said radix the difference between a signal applied to said first input of said amplifying means and the threshold level represented by the condition of said output circuit;

an analog input signal terminal connected to the first input of the first amplifying means in said series; and means for sequentially connecting the first inputs of said plurality of amplifying means to a common line adapted to carry variable analog difference signals from said amplifying means to the input circuit of said signal-comparison means, and for connecting the second inputs of said plurality of amplifying means to the output circuit of said signal-comparison means.

3. An analog to digital converter, comprising:

signal-comparison means including an input circuit and a plurality of threshold circuits connected to said input circuit, each said threshold circuit having a different threshold level and being actuable to produce an output signal in response to a signal at said input circuit having a magnitude exceeding the threshold level of said threshold circuit, said signal-comparison means further including an output circuit settable in response to said output signals to a condition representative of the magnitude of the threshold level of the actuated threshold circuit having the highest level;

a plurality of amplifying means, each said means having a first and a second input and an output and having a maximum gain substantially equal to the radix of the number system employed, said means being serially interconnected with the output of each connected to the first input of the next, each said amplifying means being connectable to said output circuit of said signal-comparison means to amplify by said radix the difference between a signal applied to said first input of said amplifying means and the threshold level represented by the condition of said output circuit;

an analog input signal terminal connected to the first input of the first amplifying means in said series; and control means for sequentially connecting the first inputs of said plurality of amplifying means to a common line adapted to carry variable analog difference signals from said amplifying means to the input circuit of said signal-comparison means, and for connecting the second inputs of said plurality of amplifying means to the output circuit of said signal-comparison means, said control means including means for storing an indication of each said setting of said output circuit of said signal-comparison means.

4. An analog to digital converter, comprising:

signal-comparison means including an input circuit and a plurality of threshold circuits connected to said input circuit, each said threshold circuit having a different threshold level and being actuable to produce an output signal in response to a signal at said input circuit having a magnitude exceeding the threshold level of said threshold circuit, said signal-comparison means further including an output circuit settable in response to said output signals to a condition digitally representative of the magnitude of the threshold level of the actuated threshold circuit having the highest level;

a plurality of digital to analog converters, each said converter including an input circuit connectable to said output circuit of said signal-comparison means to cause said digital to analog converter to produce an analog representation of the threshold level represented by the condition of said output circuit of said comparison means;

a plurality of amplifying means, each said means having a first and a second input and an output and having a maximum gain substantially equal to the radix of the number system employed, said second input of each said means connected to a different one of said digital to analog converters, said amplifying means being serially interconnected with the output of each connected to the first input of the next and each said means being adapted to amplify by said radix the difference between a signal applied to said first input of said amplifying means and the level represented by its connected digital to analog converter;

an analog input signal terminal connected to the first input of the first amplifying means in said series; and means for sequentially connecting the first inputs of said amplifying means to a common line adapted to carry variable analog difference signals to the input circuit of said signal-comparison means, and for connecting the input circuits of the digital to analog converters associated therewith to the output circuit of said signal-comparison means.

5. An analog to digital converter, comprising:

signal-comparison means including an input circuit and a plurality of threshold circuits connected to said input circuit, each said threshold circuit having a different threshold level and being actuable to produce an output signal in response to a signal at said input circuit having a magnitude exceeding the threshold level of said threshold circuit, said signal-comparison means further including an output circuit settable in response to said output signals to a condition digitally representative of the magnitude of the threshold level of the actuated threshold circuit having the highest level;

a plurality of digital to analog converters, each said converter including an input circuit connectable to said output circuit of said signal-comparison means to cause said digital to analog converter to produce an analog representation of the threshold level represented by the condition of said output circuit of said signal-comparison means;

a plurality of amplifying means, each said means having a first and a second input and an output and having a maximum gain substantially equal to the radix of the number system employed, said second input of each means connected to a different one of said digital to analog converters, said amplifying means being serially interconnected with the output of each connected to the first input of the next and each said means being adapted to amplify by said radix the difference between a signal applied to said first input of said amplifying means and the level represented by the connected digital to analog converter;

an analog input signal terminal connected to the first input of said first amplifying means in said series; and control means for sequentially connecting the first inputs of said amplifying means to a common line adapted to carry variable analog difference signals to the input circuit of said signal-comparison means, and for connecting the input circuits of the digital to analog converters associated therewith to the output circuit of said signal-comparison means, said control means including digital storage means for storing an indication of each said setting of said output circuit of said signal-comparison means.

6. An analog to digital converter, comprising:

signal-comparison means including an input circuit and a plurality of threshold circuits connected to said input circuit, each said threshold circuit having a different threshold level and being actuable to produce an output signal in response to a signal at said input circuit having a magnitude exceeding the threshold level of said threshold circuit, said signal-comparison means further including an output circuit settable in response to said output signals to a condition representative of the magnitude of the threshold level of the actuated threshold circuit having the highest level;

a plurality of radix amplifiers, each said amplifier having a first and a second input and an output and having a gain substantially equal to the radix of the number system employed, said amplifiers being serially interconnected with the output of each connected to the first input of the next, each said amplifier being connectable to said output circuit of said signal-comparison means to amplify by said radix the difference between a signal applied to said first input of said amplifier and the threshold level represented by the condition of said output circuit;

gating means for selectively connecting said second inputs of said radix amplifiers to said output circuit of said signal-comparison means;

an analog input signal terminal connected to the first input of the first radix amplifier in said series;

a plurality of switches connected to said radix amplifiers, each said switch having an input connected to said first input of its associated amplifier and having an output connected to a single line adapted to carry sequentially a plurality of variable analog difference signals from said outputs of all said switches to said input circuit of said comparison means; and control means for operating said switches and said gating means in an alternating sequence whereby analog input signals are sequentially applied to the first inputs of said radix amplifiers.

7. An analog to digital converter, comprising:

signal-comparison means including an input circuit and a plurality of threshold circuits connected to said input circuit, each said threshold circuit having a different threshold level and being actuable to produce an output signal in response to a signal at said input circuit having a magnitude exceeding the threshold level of said threshold circuit, said signal-comparison means further including an output circuit settable in response to said output signals to a condition representative of the magnitude of the threshold level of the actuated threshold circuit having the highest level;

a plurality of storage means adapted to store an indication of each said setting of said output circuit of said signal-comparison means;

a plurality of radix amplifiers, each said amplifier having a first and a second input and an output and having a gain substantially equal to the radix of the number system employed, said amplifiers being serially interconnected with the output of each connected to the first input of the next, each respective amplifier being connected to a different one of said storage means to amplify by said radix the difference between a signal applied to said first input of said respective amplifier and the threshold level represented by the indication stored in said connected storage means;

gating means for selectively transferring an indication of each said setting of said output circuit of said signal-comparison means into said storage means;

an analog input signal terminal connected to the first input of the first amplifier in said series;

a plurality of switches connected to said radix amplifiers, each said switch having an input connected to said first input of its associated amplifier and having an output connected to a single line adapted to carry sequentially a plurality of variable analog difference signals from said outputs of all said switches to said input circuit of said signal-comparison means; and control means for operating said switches and said gating means in an alternating sequence whereby analog input signals are sequentially applied to the first inputs of said radix amplifiers.

8. An analog to digital converter, comprising:

signal-comparison means including an input circuit and a plurality of threshold circuits connected to said input circuit, each said threshold circuit having a different threshold level and being actuable to produce an output signal in response to a signal at said input circuit having a magnitude exceeding the threshold level of said threshold circuit, said signal-comparison means further including an output circuit settable in response to said output signals to a condition digitally representative of the magnitude of the threshold level of the actuated threshold circuit having the highest level;

a plurality of digital storage means adapted to store an indication of each said setting of said output circuit of said signal-comparison means;

a plurality of digital to analog converters, each said converter including an input circuit connected to a different one of said storage means to cause said digital to analog converter to produce an analog representation of the threshold level represented by the indication stored in said connected storage means;

a plurality of radix amplifiers, each said amplifier having a first and a second input and an output and having a gain substantially equal to the radix of the number system employed, said second input of each said amplifier connected to a different one of said digital to analog converters, said amplifiers being serially interconnected with the output of each connected to the first input of the next and each said amplifier being adapted to amplify by said radix the difference between a signal applied to the first input of said amplifier and the level represented by the connected digital to analog converter, gating means for selectively transferring an indication of each said setting of said output circuit of said signal-comparison means into a different one of said storage means;

an analog input signal terminal connected to the first input of the first amplifier in said series;

a plurality of switches connected to said radix amplifiers, each said switch having an input connected to said first input of its associated amplifier and having an output connected to a single line adapted to carry sequentially a plurality of variable analog difference signals from said outputs of all said switches to said input circuit of said signal-comparison means; and control means for operating said switches and said gating means in an alternating sequence whereby analog input signals are sequentially applied to the first inputs of said radix amplifiers.

9. An analog to digital converter, comprising:

signal-comparison means including an input circuit and a plurality of threshold circuits connected to said input circuit, each said threshold circuit having a different threshold level and being actuable to produce an output signal in response to a signal at said input circuit having a magnitude exceeding the threshold level of said threshold circuit;

a storage register for storing the output signals from said threshold circuit;

a coding circuit settable in response to the condition of said storage register to a condition digitally representative of the magnitude of the threshold level of the actuated threshold circuit having the highest level;

a plurality of digital to analog converters, each said converter including an input circuit connectable to said coding circuit to cause said digital to analog converter to produce an analog representation of the threshold level represented by the condition of said coding circuit;

a plurality of amplifying means, each said means having a first and a second input and an output and having a gain substantially equal to the radix of the number system employed, said second input of each said means connected to a different one of said digital to analog converters, said amplifying means being serially interconnected with the output of each connected to the first input of the next and each of said means being adapted to amplify by said radix the difference between a signal applied to said first input of said amplifying means and the level represented by its connected digital to analog converter;

an analog input signal terminal connected to the first input of the first amplifying means in said series; and means for sequentially connecting the first inputs of said amplifying means to a common line adapted to carry variable analog difference signals to the input circuit of said signal-comparison means, and for connecting the input circuits of the digital to analog converters associated therewith to the input circuit of said coding means.

10. An analog to digital converter, comprising:

signal-comparison means including an input circuit and a plurality of threshold circuits connected to said input circuit, each said threshold circuit having a different threshold level and being actuable to produce an output signal in response to a signal at said input circuit having a magnitude exceeding the threshold level of said threshold circuit;

a first storage register for storing the output signals from said threshold circuit;

a coding circuit settable in response to the condition of said first storage register to a condition digitally representative of the magnitude of the threshold level of the actuated threshold circuit having the highest level;

a plurality of digital to analog converters, each said converter including an input circuit connectable to said coding circuit to cause said digital to analog converter to produce an analog representation of the threshold level represented by the condition of said coding circuit;

a plurality of amplifying means, each said means having a first and a second input and an output and having a gain substantially equal to the radix of the number system employed, said second input of each said means connected to a different one of said digital to analog converters, said amplifying means being serially interconnected with the output of each connected to the first input of the next and each said means being adapted to amplify by said radix the difference between a signal applied to said first input of said amplifying means and the level represented by the connected digital to analog converter;

an analog input signal terminal connected to the first input of said first amplifying means in said series; and control means sequentially connecting the first inputs of said amplifying means to a common line adapted to carry variable analog difference signals to the input circuit of said signal-comparison means, and for connecting the input circuits of the digital to analog converters associated therewith to the input circuit of said coding means, said control means including a plurality of second storage registers for storing an indication of each said setting of said coding circuit.

11. An analog to digital converter, comprising:

signal-comparison means including an input circuit and a plurality of threshold circuits connected to said input circuit, each said threshold circuit having a different threshold level and being actuable to produce an output signal in response to a signal at said input circuit having a magnitude exceeding the threshold level of said threshold circuit;

a first storage register for storing the output signals from said threshold circuits;

a coding circuit settable in response to the condition of said first storage register to a condition digitally representative of the magnitude of the threshold level of the actuated threshold circuit having the highest level;

a plurality of second storage registers connectable to said coding circuit to receive therefrom an indication of each said setting of said coding circuit;

a plurality of digital to analog converters, each said converter including an input circuit connected to a different one of said second storage registers to cause said digital to analog converter to produce an analog representation of the threshold level represented by the indication stored in the connected second storage register;

a plurality of radix amplifiers, each said amplifier having a first and a second input and an output and having a gain substantially equal to the radix of the number system employed, said second input of each said amplifier connected to a different one of said digital to analog converters, said amplifiers being serially interconnected with the output of each connected to the first input of the next and each said amplifier being adapted to amplify by a radix factor the difference between a signal applied to said first input of said amplifier and the level represented by the connected digital to analog converter;

an analog input signal terminal connected to the first input of the first amplifying means in said series;

gating means for selectively connecting said second storage registers to said coding circuit whereby an indication of each said setting of said coding circuit may be transferred into a different one of said second storage registers;

a plurality of switches connected to said radix amplifiers, each said switch having an input connected to said first input of its associated amplifier and having an output connected to a single line adapted to carry sequentially a plurality of variable analog difference signals from said outputs of all said switches to said input circuit of said signal-comparison means; and control means for operating said switches and said gating means in an alternating sequence whereby analog input signals are sequentially applied to the first inputs of said radix amplifiers.

References Cited

UNITED STATES PATENTS

| | | | |
|---|---|---|---|
| 3,188,624 | 6/1965 | McMillian | 340—347 |
| 3,259,896 | 7/1966 | Pan | 340—347 |
| 3,133,278 | 5/1964 | Millis | 340—347 |
| 3,072,332 | 1/1963 | Margopoulos | 235—154 |

OTHER REFERENCES

R. K. Richards, Digital Computer Components and Circuits, November 1957, pp. 492–493.

MAYNARD R. WILBUR, Primary Examiner

C. D. MILLER, Assistant Examiner

U.S. Cl. X.R.

340—347